US005462252A

United States Patent [19]

Thomas

[11] Patent Number: 5,462,252

[45] Date of Patent: Oct. 31, 1995

[54] SPILL VALVE FOR A FUEL PUMP

[75] Inventor: Gerald S. Thomas, Gloucester, England

[73] Assignee: Lucas Industries plc, England

[21] Appl. No.: 164,231

[22] Filed: Dec. 8, 1993

[30] Foreign Application Priority Data

Dec. 8, 1992 [GB] United Kingdom .................... 9225584

[51] Int. Cl.$^6$ .......................... F16K 31/122; F02M 39/00

[52] U.S. Cl. .............................. 251/25; 251/33; 251/284; 123/457

[58] Field of Search ................................ 251/60, 42, 284, 251/33, 37, 25, 30.01, 30.02; 123/457, 467, 472, 495

[56] References Cited

U.S. PATENT DOCUMENTS 3,983,855 10/1976 Jarrett .................................. 123/457 X 4,211,202 7/1980 Hafner .................................... 123/457

4,572,136 2/1986 Takeuchi et al. ................... 123/457 X

*Primary Examiner*—Gerald A. Michalsky

*Assistant Examiner*—Kevin L. Lee

*Attorney, Agent, or Firm*—Jenner & Block

[57] ABSTRACT

A spill valve for a fuel injection pump includes a valve member movable towards a seating to prevent spillage of fuel from the pumping chamber of a fuel injection pump. The valve member is actuated by a piston against which fluid pressure can be applied to close the valve member onto the seating. The movement of the valve member away from the seating is limited by a stop member but this can move to allow increased movement of the valve member when fuel at high pressure is spilled from the injection pump.

6 Claims, 1 Drawing Sheet

SPILL VALVE FOR A FUEL PUMP

Figure 1:
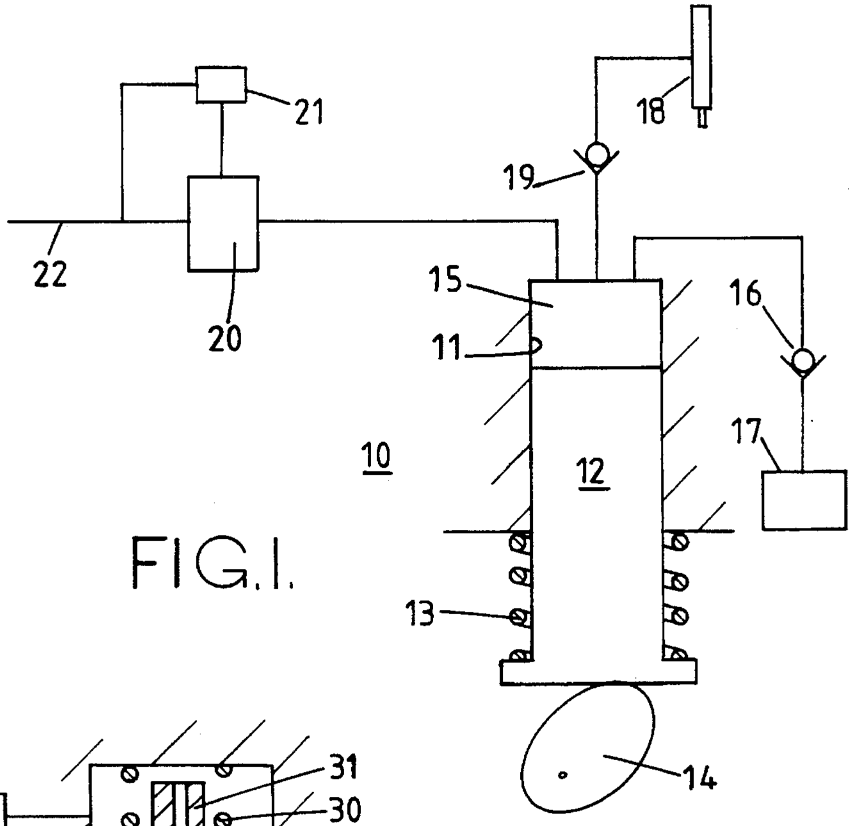

This invention relates to a spill valve for use in a fuel injection pump of the kind which is intended to supply fuel to an internal combustion engine, the spill valve controlling the escape of fuel from a pumping chamber of the pump thereby to control the start and finish of fuel delivery to the engine, the spill valve comprising a valve surface movable into engagement with a seating surface to prevent escape of fuel from the pumping chamber, a piston member for actuating the valve surface and valve means for controlling the pressure applied to the piston member, said valve means in one setting causing the application of fluid under pressure to said piston member to move the valve surface into engagement with the seating surface and in its other setting allowing the valve surface to be moved away from the seating surface by the pressure of fuel in the pumping chamber.

One method of deriving the fluid pressure which operates the piston member is to connect the cylinder which contains the piston member with the pumping chamber though a passage which contains a restrictor and to arrange that in said one position, the valve means prevents escape of fuel from the cylinder so that the fuel pressure builds up in the cylinder and the piston member moves the valve surface to the closed position, and in the other position, the valve means allows the escape of fuel from the cylinder so that the fuel pressure acting on the valve surface can urge the valve surface away from the seating surface to the open position.

In the operation of the fuel pump it is desirable to terminate the delivery of fuel as quickly as possible when it is deemed that sufficient fuel has been supplied to the combustion chamber of the associated engine. In order to do this the valve surface must move quickly to the open position and in the open position the area of the flow path defined between the seating surface and the valve surface should be as large as possible to allow a rapid reduction of the fuel pressure in the pumping chamber. However, prior to the delivery of fuel from the pumping chamber with the valve surface in the open position, the pressure of fuel in the pumping chamber will be low and therefore when the valve means is closed, the movement of the piston member and the seating surface towards the closed position will be sluggish.

The object of the present invention is to provide a spill valve for the purpose specified in a simple and convenient form.

According to the invention a spill valve of the kind specified includes movable stop means operable in a first position to limit the extent of movement of the valve surface away from the seating surface, said stop means being movable away from said first position towards a second position to allow further movement of the valve surface away from the seating surface when the pressure of fuel in the pumping chamber exceeds a predetermined value.

Figure 2:
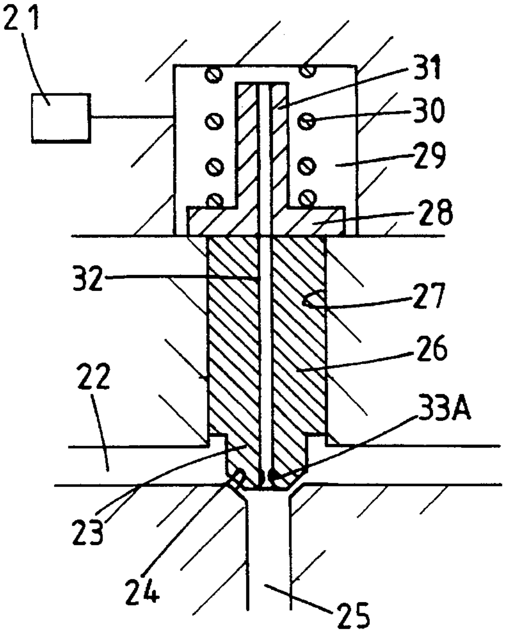
Figure 3:
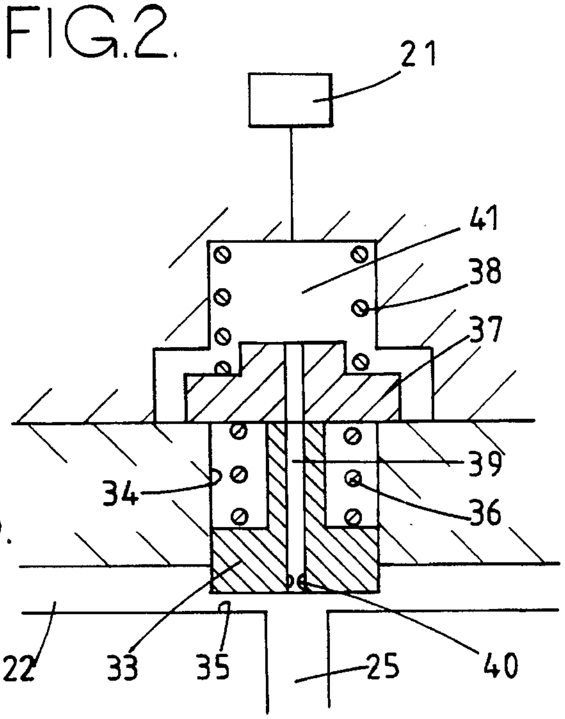

An example of a spill valve in accordance with the invention will now be described with reference to the accompanying drawings in which:

FIG. 1 is a diagrammatic representation of a fuel injection pump incorporating the spill valve, FIG. 2 is a diagrammatic representation of one example of the spill valve, and FIG. 3 is a view similar to FIG. 2 showing a further example.

Referring to FIG. 1 of the drawings the fuel pump comprises a body 10 in which is defined a bore 11. Mounted within the bore and extending therefrom is a pumping plunger 12 which is biased outwardly of the bore by means of a coiled compression spring 13. The plunger is movable inwardly against the action of the spring by means of an engine driven cam 14. The inner end of the bore defines a pumping chamber 15 which is connected by means of a non-return valve 16, to a source 17 of fuel under pressure.

The pumping chamber is also connected to an injection nozzle 18 of the associated engine by way of a delivery valve 19 which may be of the unloading type. In addition, the pumping chamber is connected to a spill valve 20 the operation of which is controlled by valve means 21 conveniently an electromagnetically operable valve, the supply of electric current to which is under the control of a control system not shown. The control system determines the position during the inward movement of the plunger at which the spill valve should close to cause delivery of fuel from the pumping chamber to the injection nozzle and also determines the later position at which the spill valve should open to terminate delivery of fuel through the nozzle to the engine. When during the inward movement of the plunger the spill valve is opened the pressure in the pumping chamber will fall and this will permit rapid closure of a valve in the fuel injection nozzle 18. Any fuel which is displaced from the pumping chamber during continued inward movement of the plunger flows through the spill valve to a drain and when the plunger starts to move outwardly, fuel is supplied to the pumping chamber by way of the non-return valve 16 from the source of fuel 17.

The fuel which escapes through the spill valve 20 may be returned to the source 17 by way of a passage 22 to which passage is also connected the outlet of the valve means 21.

Turning now to FIG. 2 of the drawings the spill valve 20 comprises a valve member 23 defining a valve surface which is movable into engagement with a seating 24 which is defined about a passage 25 which connects the spill valve with the pumping chamber 15. The valve member 23 is integrally formed with a piston 26 of larger diameter than the valve member and which is slidable within a cylinder 27. Also provided is a spring loaded stop member 28 which is housed within a chamber 29 and which is biased into engagement with a step defined at one end of the chamber by means of a spring 30. The stop member is provided with an extension 31 which is disposed within the spring 30 and which after a predetermined movement of the stop member away from the step, engages the other end of the chamber. The chamber 29 is in communication with the inlet of the electromagnetically operable valve means 21 and when the stop member is in its first position in engagement with the aforesaid step, the extent of movement of the piston 26 and the valve member 23 away from the seating 24 is limited.

Extending axially within the valve member and the piston is a passage 32 which incorporates a restrictor 33A and a further passage is formed in the stop member 28 and the extension 31. Conveniently the face of the piston which is presented to the stop member or the corresponding surface of the stop member is convex to ensure that the end surface of the piston is exposed to the pressure in the chamber 29.

In operation, with the valve means 21 open the pressure in the chamber 29 will be equal to the pressure in the passage 22 and as soon as inward movement of the pumping plunger 12 takes place fuel will flow from the pumping chamber through the passage 25. The fuel pressure acting on the valve member 23 will urge the valve member away from the seating until the piston 26 engages with the stop member 28. The restricted flow area defined between the valve member and the seating is such that the fuel in the pumping chamber is pressurised to a limited extent and fuel flow will take place by way of the restrictor 33A into the chamber 29 and through the valve means 21 to the passage 22. When delivery of fuel is required the valve means 21 is closed so that the pressure of fuel in the chamber 29 increases and this pressure acting on the end surface of the piston 26 remote from the valve member causes movement of the piston and the valve member towards the seating. In the closed position of the valve member the fuel pressure in the pumping chamber increases to the level required to cause delivery of fuel through the injection nozzle 18 to the associated engine. The valve member 23 is held in engagement with the seating 24 by the pressure of fuel acting on the end of the piston remote from the valve member. The force generated by this pressure is opposed by the lesser forces produced by the same pressure acting on the end of the valve member lying within the seating area and the force produced by the relatively low pressure within the passage 22 acting upon the annular end area of the piston adjacent the valve member.

When during delivery of fuel to the engine the valve 21 is opened, the pressure in the chamber 29 is reduced to the pressure in the passage 22 and the pressure of fuel in the pumping chamber acting on the end surface of the valve member 23 urges the valve member away from the seating to allow spillage of fuel. Since the fuel is at high pressure the force acting on the valve member 26 will exceed the force exerted by the spring 30 on the stop member 28 which will move away from its first position thereby allowing the valve member to move away from the seating beyond the position shown in FIG. 2. The limit of movement is determined by the abutment of the extension 31 with the end of the chamber 29. A rapid reduction of fuel pressure in the pumping chamber takes place and the valve member in the fuel injection nozzle can close quickly. Once the high pressure in the pumping chamber has been released the piston and valve member may be returned to the position shown as the plunger 12 continues its inward movement, by the action of the spring 30.

An alternative construction of the spill valve is seen in FIG. 3 and in this case the valve member and piston of the spill valve shown in FIG. 2, are combined in a stepped piston 33 slidable in a cylinder 34. The passage 25 opens onto an end surface 35 of the cylinder, this surface constituting the sealing surface of the valve, and the end of the piston forming the valve surface. The two surfaces are biased into sealing engagement by a spring 36. The spring is interposed between the piston and a stop member 37 which is itself biased into engagement with a step defined at the end of the cylinder in which it is mounted, by a further spring 38. The force exerted by the spring 38 is greater than the force exerted by the spring 36 and the extent of movement of the stop member against the action of the spring 38 is limited by a further step defined in the cylinder in which it is mounted. As in the example shown in FIG. 2, the piston 33 has a central passage 39 incorporating a restrictor 40 and the passage is continued in the stop member 37 into a chamber 41 which communicates with the valve 21.

In operation, with the valve means 21 open, during the initial inward movement of the plunger 12 the piston 33 is forced away from the end surface 35 against the action of the spring 36. The extent of such movement is limited by the engagement of the piston with the stop member and the flow of fuel through the gap defined between the end surface 35 and the piston is restricted as in the previous example. When the valve means 21 is closed the spring 36 as well as the increased pressure in the chamber 41, which acts on the piston 33, closes the piston onto the end surface 35 and delivery of fuel takes place to the associated engine. When the valve means 21 is opened the pressure in the chamber 41 falls and the high fuel pressure in the pumping chamber moves the piston away from the seating surface against the action of the spring 36 until the piston engages the stop member 37 and further movement of the piston and stop member takes place against the action of the spring 38. The pressure in the pumping chamber is therefore released to allow closure of the valve member in the fuel injection nozzle 18.

An equivalent of the spring 36 of the example shown in FIG. 3 may be incorporated into the example of FIG. 2 moreover, as with the example of FIG. 2 the spring 36 in the example of FIG. 3 may be omitted. As with the example of FIG. 2 the surface of the piston 33 which engages the stop member 37 or the corresponding surface of the stop member is convex.

I claim:

1. A spill valve for use in a fuel injection pump of the kind which is intended to supply fuel to an internal combustion engine, the spill valve controlling the escape of fuel from a pumping chamber of the pump thereby to control the start and finish of fuel delivery to the engine, the spill valve comprising a valve surface movable into engagement with a seating surface to prevent escape of fuel from the pumping chamber, a piston member defining the valve surface and valve means for controlling the pressure applied to the piston member, said valve means comprising a two position valve which in one setting causes the application of fluid under pressure to said piston member to move the valve surface into engagement with the seating surface and in its other setting allowing the valve surface to be moved away from the seating surface by the pressure of fuel in the pumping chamber, the spill valve further including movable stop means operable in a first position to limit the extent of movement of the valve surface away from the seating surface, said stop means being movable away from said first position towards a second position to allow further movement of the valve surface away from the seating surface when the pressure of fuel in the pumping chamber exceeds a predetermined value.

2. A spill valve according to claim 1, in which said stop means is biased to the first position by resilient means.

3. A spill valve according to claim 2, in which the piston member is slidable within a cylinder and the stop means is located in a chamber at one end of the cylinder, said stop means being biased by a spring into engagement with a step defined at the junction of the cylinder and the chamber, the step determining said first position of the stop means, the second position of the stop means being determined by a surface defined by the wall of the chamber.

4. A spill valve according to claim 3, in which the fluid under pressure is supplied to said chamber through a restrictor from a passage which opens onto said seating surface and which communicates with said pumping chamber.

5. A spill valve according to claim 4, in which said restrictor is incorporated in a further passage extending through the piston member and the stop means.

6. A spill valve according to claim 3, including a further spring acting to urge the valve surface into engagement with the seating surface.

* * * * *